US008694529B1

(12) United States Patent
Hotchkies et al.

(10) Patent No.: US 8,694,529 B1
(45) Date of Patent: Apr. 8, 2014

(54) REFINEMENT SURFACING FOR SEARCH HIERARCHIES

(75) Inventors: Blair L. Hotchkies, Bellevue, WA (US); Daniel R. Parshall, Redmond, WA (US); Jason P. Patrikios, Seattle, WA (US); Brent Robert Mills, Seattle, WA (US); Dan Catalin Teodorescu, Shoreline, WA (US); Jennica Jane Pounds, Bothell, WA (US); Paul Daniel Jaye, Seattle, WA (US); David Aaron Lichterman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 526 days.

(21) Appl. No.: 12/695,990

(22) Filed: Jan. 28, 2010

(51) Int. Cl.
*G06F 17/30* (2006.01)
*G06F 17/00* (2006.01)

(52) U.S. Cl.
USPC .......................................... 707/766; 707/767

(58) Field of Classification Search
CPC .......... G06F 17/30864; G06F 17/3053; G06F 17/30867; G06F 17/30554; G06F 17/30; G06F 17/30424; G06F 17/30796; G06F 17/3087; G06F 17/3097; G06F 17/30386; G06F 17/30253; G06F 17/30648; G06F 17/30675; G06F 17/30696; G06F 17/30705
USPC .................................................. 707/766, 767
See application file for complete search history.

(56) References Cited

U.S. PATENT DOCUMENTS

| 7,502,819 | B2 * | 3/2009 | Alonso | 709/203 |
|---|---|---|---|---|
| 7,814,096 | B1 * | 10/2010 | Roy | 707/721 |
| 2007/0060099 | A1 * | 3/2007 | Ramer et al. | 455/405 |
| 2010/0070448 | A1 * | 3/2010 | Omoigui | 706/47 |
| 2011/0125739 | A1 * | 5/2011 | Wexler et al. | 707/734 |

\* cited by examiner

*Primary Examiner* — Yicun Wu
(74) *Attorney, Agent, or Firm* — Novak Druce Conolly Bove + Quigg LLP

(57) ABSTRACT

A collection of items may be categorized according to a category hierarchy. A search of the items may be explicitly associated with a particular category in the hierarchy or else unassociated. A set of refinements may be available, for example, to help narrow the search. Refinements may be applicable to items in linked categories. Refinements may be surfaced based at least in part on linked categories associated with the search. Refinements may be surfaced when the search is unassociated with a particular category. For example, a possibly relevant set of categories may be determined. Refinements may be surfaced according to a variety of ordering criteria.

25 Claims, 11 Drawing Sheets

REFINEMENT SURFACING FOR SEARCH HIERARCHIES

BACKGROUND

It has become common to use computers to search through large collections of electronic records. In a typical search, a searcher may indicate an interest in some subset of the entire collection using one or more search terms such as words of English or any suitable language. However, such subsets may still be relatively large, particularly where the searcher is a person desiring to review no more than a few records in detail. Furthermore, such subsets may include records perceived by the searcher to be unrelated to the object of the search, for example, because of ambiguities in natural language. As an illustration, if the supplied search term is "bass", the searcher may be interested in a type of guitar, a type of fish, a brand of beer or something else entirely.

Narrowing the search, for example, by supplying addition search terms, is not necessarily straight forward. When the underlying search space is complex, it is relatively easy for items of interest to be excluded from a search result set by premature search narrowing. For some applications, such premature search narrowing may have significant negative consequences, for example, negative commercial consequences including loss of a sale.

Some conventional search techniques include guided search narrowing. However, each of these techniques has its flaws. For example, some conventional search techniques categorize items of interest and attempt to explicitly associate the search with a particular category. However, manual category association may be laborious and/or fail to avoid premature search narrowing. On the other hand, it may be difficult to achieve sufficient associative confidence, for example, from the context of the search, to enable helpful automatic category association.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
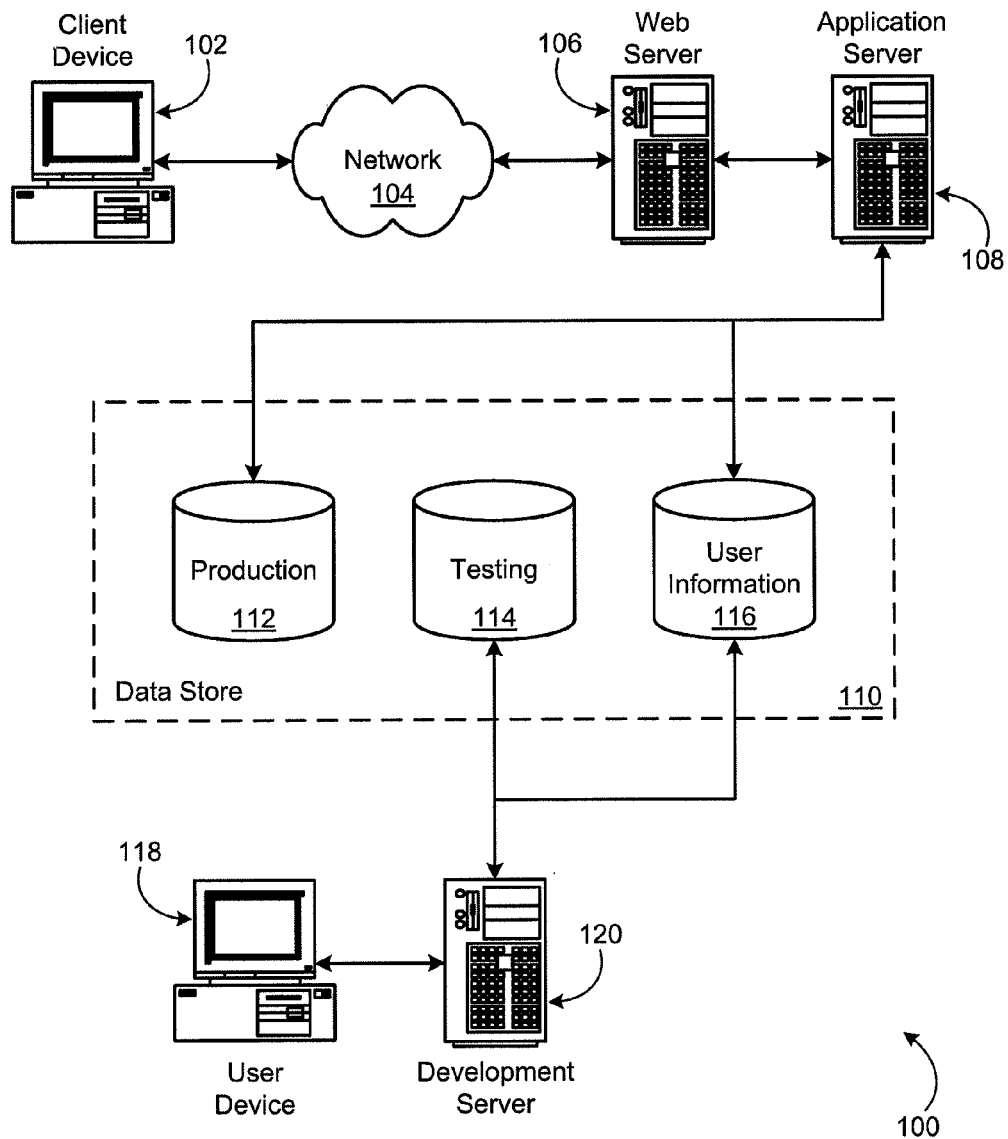
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, a search of items of interest ("items") or other such content may result in a search result set. For example, the search result set may include those items that best match one or more search terms. In at least one embodiment, the items may be categorized by a set of item categories ("categories") arranged in a category hierarchy. The search of the items of interest may be associated with one or more categories in the category hierarchy. For example, the search result set may include items in the category that best match the search term(s). In at least one embodiment, the search result set may be constrained by the category. Alternatively, the search may be unassociated with a particular category. For example, it may be that, by default, the search is unassociated with a particular category.

In at least one embodiment, a set of search refinements ("refinements") may be available. Selection of a refinement, for example, by a searcher such as a user of a computer-implemented search system, may narrow the search. That is, the search result set may be reduced in accordance with the refinement. At least some of the categories may be linked to at least some of the refinements. In at least one embodiment, refinements may be applicable to items in those categories to which they are linked ("linked categories"). In at least one embodiment, refinements may not be applicable to items in those categories to which they are not linked ("unlinked categories").

Refinements may be selected and/or presented ("surfaced") based at least in part on one or more linked categories associated with the search. In at least one embodiment, one or more refinements for the search may be surfaced even when the search is unassociated with a particular category. The search term(s) may be mapped to a set of possibly relevant categories with a refinement surfacing map. The set of possibly relevant categories may be linked to a set of possibly relevant refinements. The one or more refinements for surfacing may be selected from the set of possibly relevant refinements. The set of possibly relevant refinements may be ordered according to a variety of ordering criteria. Selection of the one or more refinements for surfacing may be based at least in part on the ordering.

As a particular illustration, consider a user searching an electronic marketplace with the search term "digital camera." The electronic marketplace may be organized, at a high level, into one or more commercial units or departments such as "Electronics," "Books," and "Office Supplies." If the initial search is unassociated with a particular department and/or item category, the search result set may be large, including books about digital cameras and a multitude of digital camera accessories as well as the digital cameras themselves. Suppose there is a "Digital Camera" sub-category of the "Electronics" item category. Automatically constraining the search to the "Digital Camera" sub-category may significantly reduce the size of the search result set. However, it may be that an analysis, for example, of historical searches using the search term "digital camera", indicates that a significant number of such searchers are not ultimately interested in items in the "Digital Camera" category. That is, there may be insufficient confidence in the correlation between the search term and the category to warrant automatic association of the two. In at least one embodiment, such confidence information may instead be utilized to surface one or more refinements, for example, refinements linked to possibly relevant categories. Continuing the illustration, a refinement "Megapixels" with refinement value options "<6," "6-7.9," "8-9.9," and "10+" may be surfaced responsive to the search term "digital camera." Should the user select the "Megapixels" refinement or one of its refinement value options, the user action may increase a confidence that the user is interested in items in the "Digital Camera" category. The search may even be automatically constrained to the "Digital Camera" category, for example, should the associative confidence consequently rise above a sufficiency threshold.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like. The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment. The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example. The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
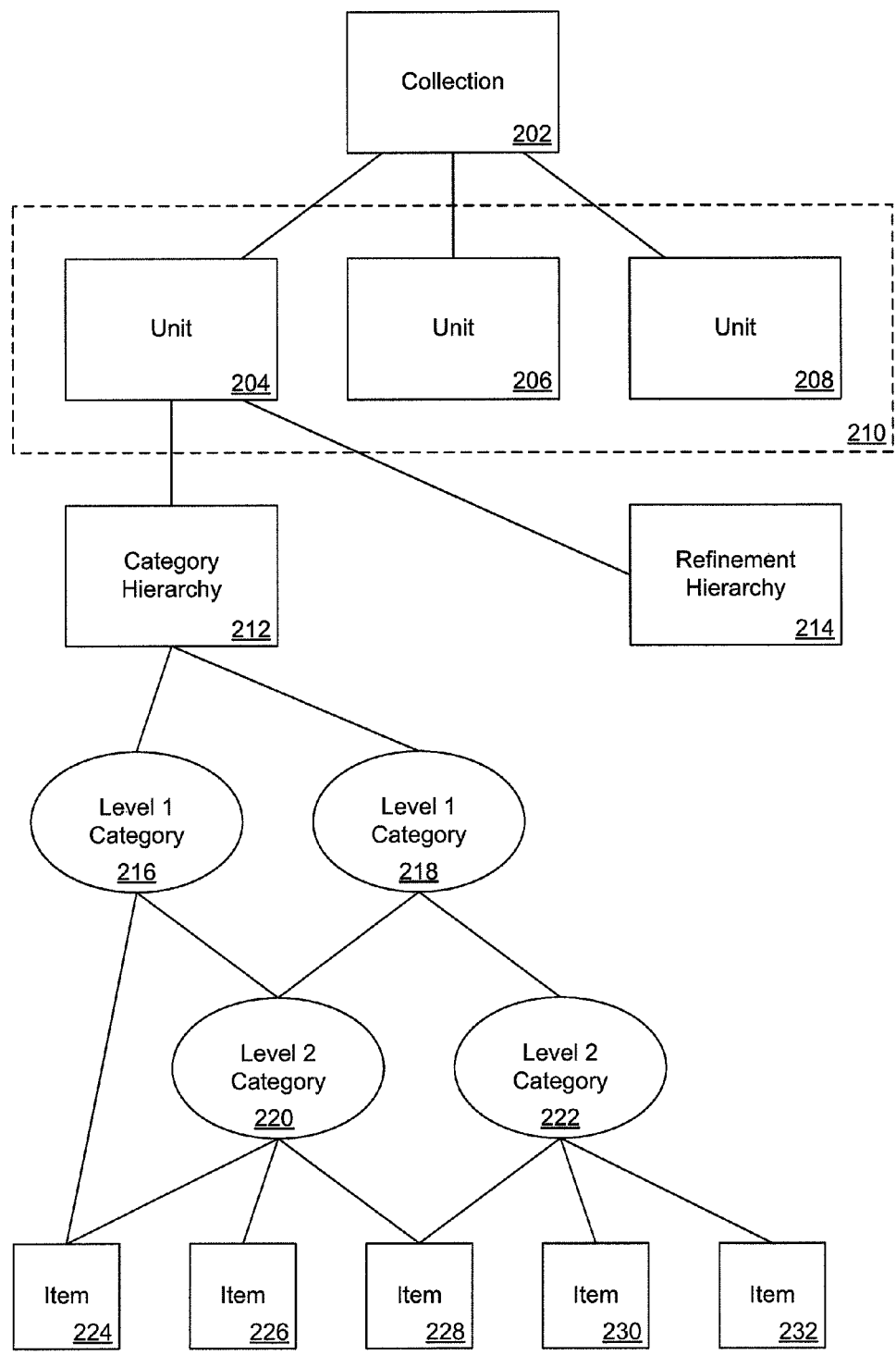
FIG. 2 is a schematic diagram depicting aspects of an example collection in accordance with at least one embodiment.

As described above, items may be categorized by a set of categories. Furthermore, the set of categories may be arranged in a category hierarchy. The items and/or the categories may be further organized in a variety of data structures such as a collection. FIG. 2 depicts aspects of an example collection 202 in accordance with an embodiment of the invention. The collection 202 may be partitioned into a plurality of units 204, 206, 208. Collectively, the units 204, 206, 208 may form a unit layer 210 of the collection 202. Each unit 204, 206, 208 may include, and/or have reference to, a category hierarchy such as a category hierarchy 212 and a refinement hierarchy such as a refinement hierarchy 214. The category hierarchy 212 may include a plurality of categories 216, 218, 220, 222. The categories 216, 218, 220, 222 may categorize a plurality of items 224, 226, 228, 230, 232.

The items 224, 226, 228, 230, 232 in the collection 202 may be any suitable items of interest. Examples of suitable items include, but are not limited to, electronic records, data structures, data objects, representations including representations of goods such as physical goods and commercial goods and representations of services such as commercial services, documents, document collections, and suitable combinations thereof. The items 224, 226, 228, 230, 232 may be a portion of a larger plurality of items (not shown in FIG. 2). Ones of the larger plurality of items may be allocated and/or assigned to a unit 204, 206, 208 in the unit layer 210. For example, the items 224, 226, 228, 230, 232 may be assigned to the unit 204. The units 204, 206, 208 of the unit layer 210 may partition the larger plurality of items. In at least one embodiment, the partition of the larger plurality of items may be strict. However, each embodiment need not be so limited.

The items 224, 226, 228, 230, 232 may be categorized into ones of the categories 216, 218, 220, 222. The categories 216, 218, 220, 222 may be any suitable category of item. Examples of suitable categories include, but are not limited to, categories corresponding to item type, item purpose, item use and item location, categories corresponding to users, owners and/or consumers of items, and suitable combinations thereof. For example, each item 224, 226, 228, 230, 232 may be explicitly associated with one or more of the categories 216, 218, 220, 222 as belonging to the category or categories. In at least one embodiment, each item 224, 226, 228, 230, 232 may be categorized into at least one of the categories 216, 218, 220, 222. However, each embodiment need not be so limited. For example, item 224 may belong to category 216 and category 220. Item 226 may belong to category 220. Item 228 may belong to category 220 and category 222. Item 230 and item 232 may belong to category 222.

The categories 216, 218, 220, 222 may be arranged in the category hierarchy 212. For example, each category 216, 218, 220, 222 may be explicitly associated with one or more others of the categories 216, 218, 220, 222 as belonging to and/or being a sub-category of the category or categories. The box 212 in FIG. 2 may be considered as depicting the category hierarchy including categories 216, 218, 220, 222. In addition, the box 212 in FIG. 2 may be considered as depicting a root category 212 of the category hierarchy including categories 216, 218, 220, 222. The category hierarchy 212 may include sub-hierarchies which may be similarly referenced by their root category. For example, the categories 218, 220 and 222 may be considered a sub-hierarchy 218 of the category hierarchy 212 and may be referenced as the sub-hierarchy 218 having root category 218, the sub-hierarchy 218 rooted at category 218, or simply the sub-hierarchy 218. As another example, the categories 216 and 220 form a sub-hierarchy 216 of the category hierarchy 212 rooted at the category 216. The category 220 may also, by itself, be considered a sub-hierarchy 220 of the category hierarchy 212. Similarly, the category 222 may be referenced as the sub-hierarchy 222. The terminology "proper sub-hierarchy" and the like may be used herein in its usual technical sense of strict containment. For example, sub-hierarchies 216 and 218 are proper sub-hierarchies of the category hierarchy 212. Whereas, while sub-hierarchy 212 may be formally considered a sub-hierarchy of the category hierarchy 212 (i.e., of itself), it is not a proper sub-hierarchy.

Categories 216, 218, 220, 222 may be associated with a level in the category hierarchy 212. For example, the level of a particular category 216, 218, 220, 222 may be a length of a path through the category hierarchy 212 from the category 216, 218, 220, 222 to the root category 212. The categories 216 and 218 may be considered as a first level, or as level one, of the category hierarchy 212. Accordingly, the categories 216 and 218 may be referred to as level one categories. The categories 220 and 222 may be considered as a second level, or as level two, of the category hierarchy 212. Accordingly, the categories 220 and 222 may be referred to as level two categories. Like terminology may be used for further levels. The category hierarchy 212 may have any suitable number of levels including one level. The root category 212 may be referred to as a level zero category. Categories having a higher level number (e.g., categories 220, 222) may be understood as being lower in the category hierarchy 212 and/or below categories having a lower level number (e.g., categories 216, 218).

In the category hierarchy 212 depicted in FIG. 2, the category 222 is depicted as belonging to and/or being a sub-category of the category 218. Category 220 is depicted as belonging to and/or being a sub-category of the category 218 and also of the category 216. Categories 216 and 218 are depicted as belonging to and/or being a sub-category of the root category 212 of the category hierarchy 212. In at least one embodiment, categories 212, 216, 218, 220, 222 may be considered as transitively containing each category 212, 216, 218, 220, 222 in the sub-hierarchy 212, 216, 218, 220, 222 for which they are the root category. In at least one embodiment, categories 212, 216, 218, 220, 222 may be considered as transitively containing each item 224, 226, 228, 230, 232 in the sub-hierarchy 212, 216, 218, 220, 222 for which they are the root category.

In at least one embodiment, the category hierarchy 212 may be considered a sub-hierarchy of a category hierarchy 202 rooted at a category 202 corresponding to the collection 202. For example, the category 202 may correspond to a collection category and/or an all items category. When the category hierarchy 212 is considered a sub-hierarchy of the category hierarchy 202, the category 212 may correspond to the unit 204, and a categories' level in the hierarchy 202 may be increased from the level indicated in FIG. 2, for example, increased by one.

Figure 3:
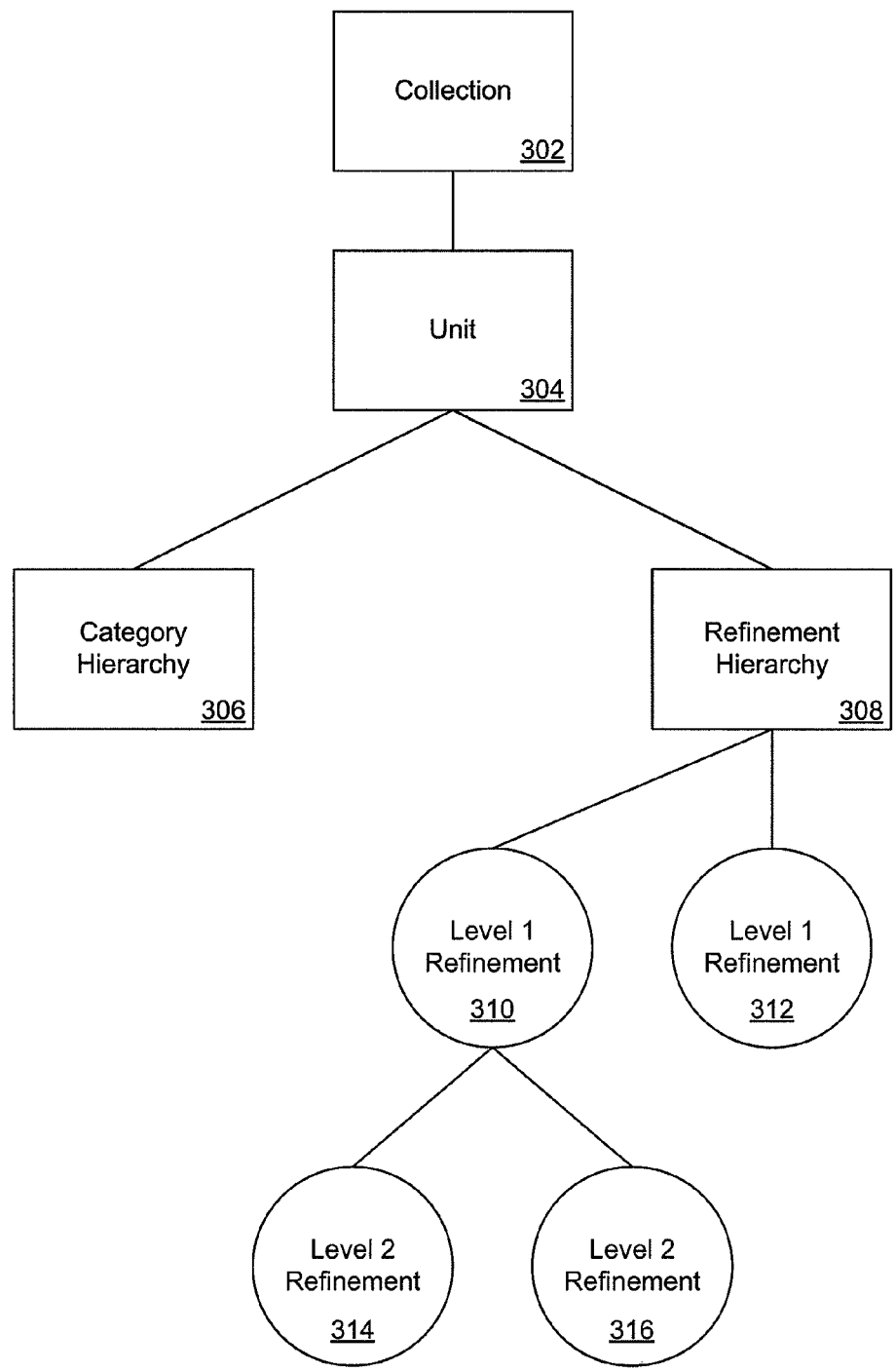
FIG. 3 is a schematic diagram depicting aspects of another example collection including refinement hierarchy details in accordance with at least one embodiment.

It will be helpful to describe further details of the refinement hierarchy 214. FIG. 3 depicts aspects of another example collection 302 including refinement hierarchy details in accordance with at least one embodiment. As with the collection 202 of FIG. 2, the collection 302 may be partitioned into a plurality of units such as the unit 304, although in FIG. 3, for clarity, only one unit 304 is shown. Also as with the units 204, 206, 208, the unit 304 may include, and/or have reference to, a category hierarchy 306 and a refinement hierarchy 308. The category hierarchy 212 is an example of the category hierarchy 306. The refinement hierarchy 308 is an example of the refinement hierarchy 214.

The refinement hierarchy 308 may include a set of refinements 310, 312, 314, 316. The refinements 310, 312, 314, 316 may be any suitable search refinement. Examples of suitable search refinements include, but are not limited to, refinements corresponding to subsets and/or ranges of item attribute values including item attributes having values selected from an enumeration and item attributes having values selected from a continuum. Each refinement 310, 312, 314, 316 may be applicable to some particular subset of items in the collection 302. For example, the refinement 314 may correspond to a particular set of display sizes, and may be applicable to items in the collection 302 having a display. There need not be an applicable refinement for each item in the collection 302.

The refinements 310, 312, 314, 316 may be arranged in the refinement hierarchy 308. For example, ones of the refinements 310, 312, 314, 316 may be associated with others of the refinements 310, 312, 314, 316 as applicable to same and/or similar subsets of items. The terminology related to sub-hierarchies as described above with respect to categories and category hierarchies may be applied to refinements and refinement hierarchies. For example, the refinements 310, 314 and 316 may be considered a sub-hierarchy 310 of the refinement hierarchy 308 rooted at refinement 310. Similarly, refinements 310, 312, 314, 316 may be associated with a level in the refinement hierarchy 308. For example, the level of a particular refinement 310, 312, 314, 316 may be a length of a path in the refinement hierarchy 308 from the refinement 310, 312, 314, 316 to the root of the refinement hierarchy 308. The refinement hierarchy 308 may have any suitable number of levels including one level.

Figure 4:
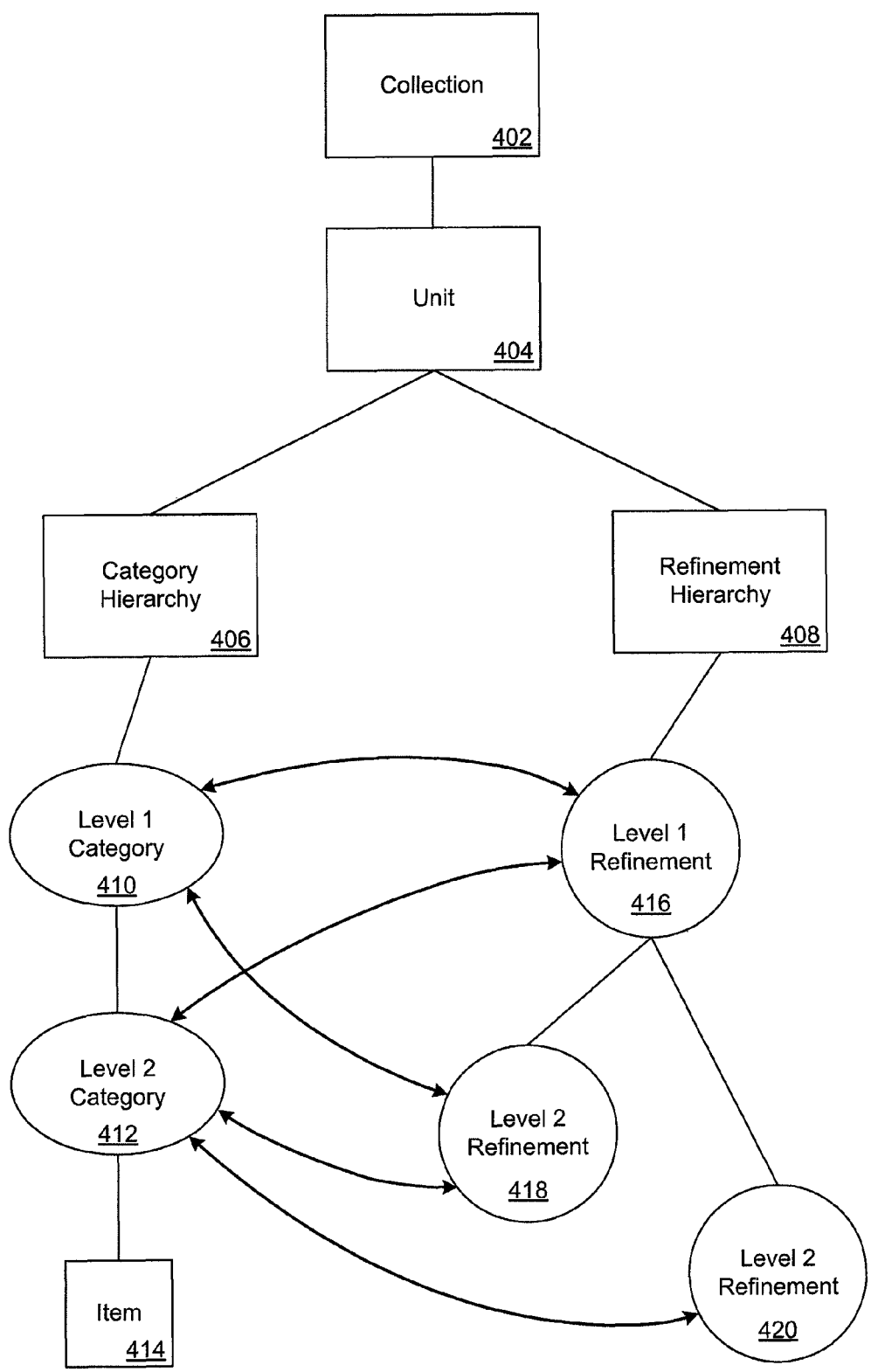
FIG. 4 is a schematic diagram depicting aspects of yet another example collection including linked categories and refinements in accordance with at least one embodiment.

Ones of the categories 216, 218, 220, 222 (FIG. 2) may be linked to ones of the refinements 310, 312, 314, 316. FIG. 4 depicts aspects of yet another example collection 402 including linked categories and refinements in accordance with at least one embodiment. As for the collection 302 depicted in FIG. 3, the collection 402 may be partitioned into a plurality of units such as the unit 404, although, for clarity, only the unit 404 is shown in FIG. 4. Also as in collections 202 and 302, the unit 404 may have reference to a category hierarchy 406 and a refinement hierarchy 408. For clarity, only portions of the category hierarchy 406 and the refinement hierarchy 408 are shown in FIG. 4.

In FIG. 4, the category hierarchy 406 is shown as including a level 1 category 410 and a level 2 category 412. For example, the level 1 category 410 may correspond to the level 1 category 218 in FIG. 2, and the level 2 category 412 may correspond to the level 2 category 220. A single item 414 is show as belonging to the level 2 category 412. Of course, as described above, the collection 402, the category hierarchy 406 and/or the categories 410, 412 may include any suitable number of items such as the item 414. For example, the item 414 may correspond to the item 228 of FIG. 2. The refinement hierarchy 408 is shown as including a level 1 refinement 416 and two level 2 refinements 418 and 420. For example, the level 1 refinement 416 may correspond to the level 1 refinement 310 of FIG. 3, and the level 2 refinements 418, 420 may correspond to the level 2 refinements 314, 316, respectively.

As shown in FIG. 4, the level 1 category 410 may be linked to the level 1 refinement 416 and the level 2 refinement 418. The level 1 refinement 416 may be applicable to items in the level 1 category 410. The level 1 refinement 416 may be applicable to items in categories of the sub-hierarchy 410 rooted at the level 1 category 410. The level 1 refinement 416 may be applicable to items in the level 2 category 412. The level 2 refinement 418 may be applicable to items in categories of the sub-hierarchy 410 rooted at the level 1 category 410. The level 2 category 412 may be further linked to the level 2 refinement 420. The level 2 refinement 420 may be applicable to items in the level 2 category 412.

Figure 5:
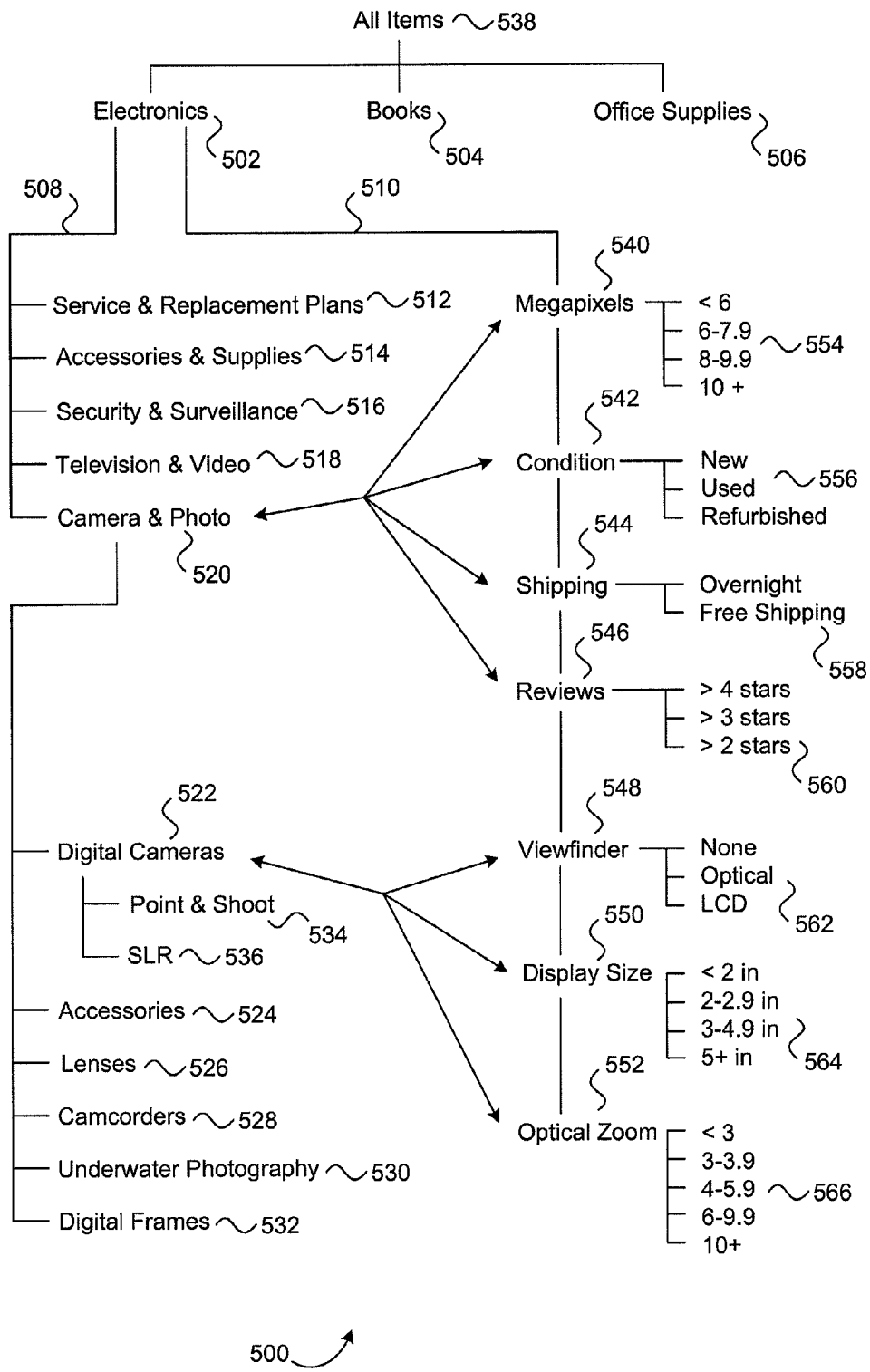
FIG. 5 is a schematic diagram depicting aspects of an example collection of commercial items in accordance with at least one embodiment.

It will be helpful to have reference to a particular example of the collection 402. FIG. 5 depicts aspects of an example collection 500 of commercial items in accordance with at least one embodiment (the items themselves are not shown in FIG. 5). As with the collection 402 (FIG. 4), the collection 500 may include multiple units such as the unit 404. In FIG. 5, the collection 500 includes units "Electronics" 502, "Books" 504 and "Office Supplies" 506. The units 502, 504, 506 of the collection 500 may correspond to commercial units such as stores or departments. The units 502, 504, 506 may correspond to consumer expectations of a marketplace or commercial space, for example, as ascertained with consumer research such as surveys.

The units 502, 504, 506 of the collection 500 may also include a category hierarchy such as a category hierarchy 508 and a refinement hierarchy such as a refinement hierarchy 510 corresponding to the category hierarchy 406 and the refinement hierarchy 408 of FIG. 4, respectively. The category hierarchy 508 of the "Electronics" unit 502 may include multiple level 1 categories such as a "Service & Replacement Plans" category 512, an "Accessories & Supplies" category 514, a "Security & Surveillance" category 516, a "Television & Video" category 518, and a "Camera & Photo" category 520. The category hierarchy 508 of the "Electronics" unit 502 may also include multiple level 2 categories such as a "Digital Cameras" category 522, an "Accessories" category 524, a "Lenses" category 526, a "Camcorders" category 528, an "Underwater Photography" category 530 and a "Digital Frames" category 532. In the collection 500, the level 2 categories 522, 524, 526, 528, 530, 532 are each sub-categories of the "Camera & Photo" category 520. The collection 500 is further depicted as including level 3 categories such as a "Point & Shoot" category 534 and an "SLR" category 536. The level 3 categories 534, 536 are each sub-categories of the "Digital Cameras" category 522. The "Electronics" unit 502 may be considered a "level zero" category. In addition, there may be considered to be an "all items" category 538 containing all items and categories 502, 504, 506, 512, 514, 516, 518, 520, 522, 524, 526, 528, 530, 532, 534, 536 of the collection 500. In that case, as described above, level numbers may be suitably adjusted, for example, increased by one.

The refinement hierarchy 510 my include multiple level 1 refinements such as a "Megapixels" refinement 540, a "Condition" refinement 542, a "Shipping" refinement 544, a "Reviews" refinement 546, a "Viewfinder" refinement 548, a "Display Size" refinement 550 and an "Optical Zoom" refinement 552. The refinement hierarchy 510 may also include multiple sets of level 2 refinements 554, 556, 558, 560, 562, 564, 566. In this example, each level 1 refinement 540, 542, 544, 546, 548, 550 and 552 has a corresponding set of level 2 refinements 554, 556, 558, 560, 562, 564 and 566, respectively. As in this example, the refinements in the sets of level 2 refinements 554, 556, 558, 560, 562, 564, 566 may correspond to value options for level 1 refinements 540, 542, 544, 546, 548, 550, 552. For example, the "Megapixels" level 1 refinement 540 has the corresponding set of level 2 refinements: "<6," "6-7.9," "8-9.9" and "10+."

As for the collection 402 of FIG. 4, ones of the categories 502, 504, 506, 512, 514, 516, 518, 520, 522, 524, 526, 528, 530, 532, 534, 536 of the collection 500 may be linked to ones of the refinements 540, 542, 544, 546, 548, 550, 552, 554, 556, 558, 560, 562, 564, 566. In FIG. 5, the "Camera & Photo" level 1 category 520 is shown as linked to the level 1 refinements 540, 542, 544, 546, and the "Digital Cameras" level 2 category 522 is shown as linked to the level 1 refinements 548, 550, 552. In at least one embodiment, determination of a set of candidate refinements to surface may be based at least in part on such links. For example, refinements 548, 550, 552 may be considered as candidates for surfacing if linked category 522 is included in a set of possibly relevant categories. Determination of the set of candidate refinements to surface may be independent of a hierarchical structure and/or arrangement of the categories 502, 504, 506, 512, 514, 516, 518, 520, 522, 524, 526, 528, 530, 532, 534, 536 of the collection 500. Alternatively, refinements linked to a super-category of a possibly relevant category may be also be considered candidates for surfacing. For example, in this case, if the "Digital Cameras" level 2 category 522 has been determined to be a possibly relevant category, then the refinements 540, 542, 544, 546, 548, 550, 552 may be considered candidates for surfacing because the "Camera & Photo" level 1 category 520 is a super-category of the "Digital Cameras" category 522.

Figure 6:
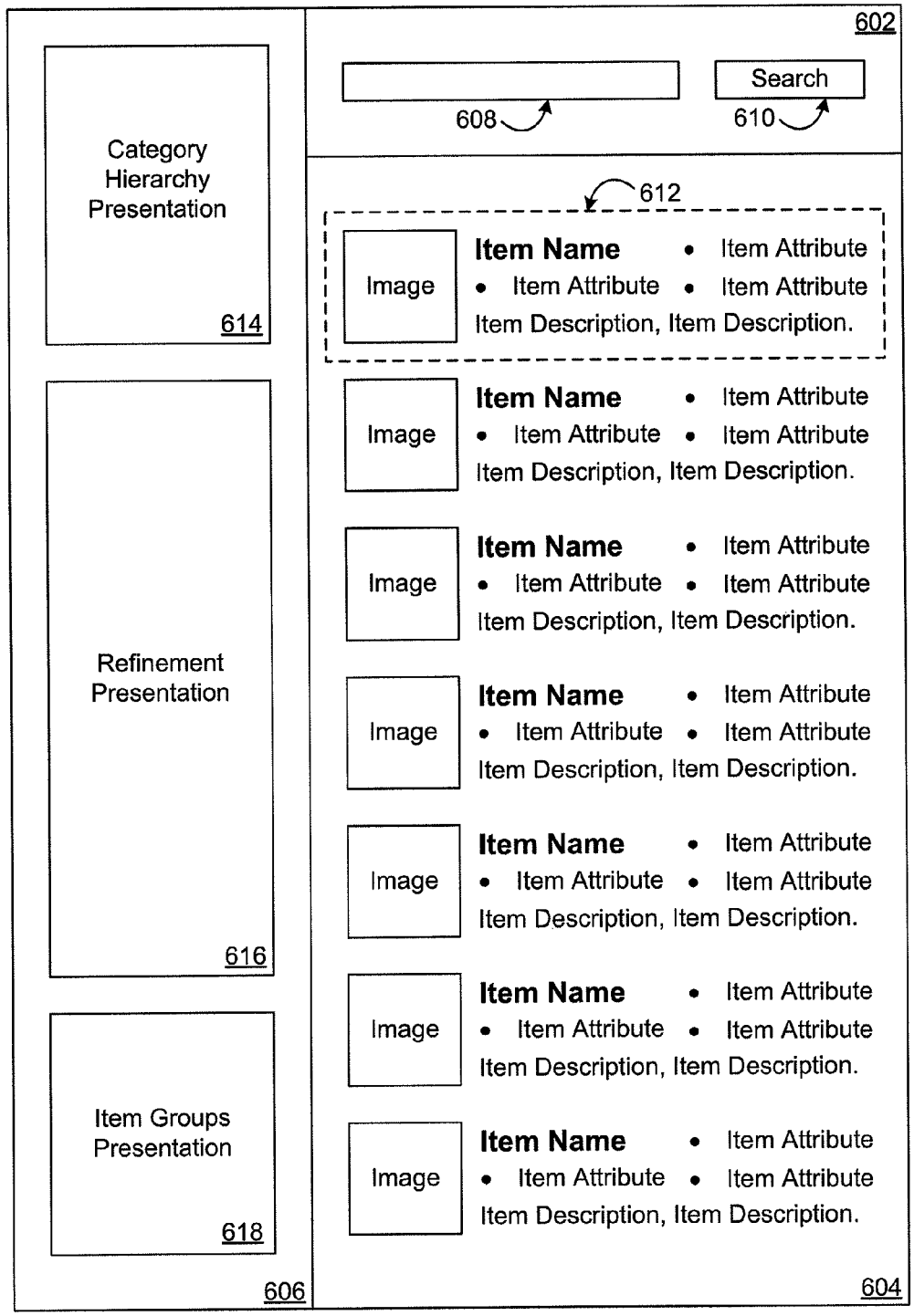
FIG. 6 is a schematic diagram depicting aspects of an example user interface in accordance with at least one embodiment.

The category hierarchy 212 (FIG. 2) and the refinement hierarchy 308 (FIG. 3) may be presented to the searcher, for example, presented in a user interface (UI) such as a graphical user interface (GUI) and/or a Web-based user interface. However, it is not uncommon that such a presentation include only a portion of the category hierarchy 212 and/or the refinement hierarchy 308, for example, due to presentation device and/or human information processing characteristics such as limitations. It will be helpful to have reference to an example presentation. FIG. 6 depicts aspects of an example user interface 600 in accordance with at least one embodiment.

The user interface 600 may include graphical user interface (GUI) components such as a search input component 602, a search result component 604 and a search navigation component 606. However, each embodiment need not be so limited. The user interface 600 may incorporate any suitable user interface (UI) component Examples of suitable user interface components include, but are not limited to, components configured to cause, monitor, alter and/or suppress a human perception and/or a human sensory event including visual perceptions, auditory perceptions, tactile perceptions and kinesthetic perceptions. For example, the user interface 600 may be presented to the user by the client device 102 of FIG. 1.

The search input component 602 may include a text input component 608 and a search submission component 610. The search result component 604 may include a plurality of search result presentations such as the search result presentation 612. The search navigation component 606 may include a category hierarchy presentation 614, a refinement presentation 616 and an item groups presentation 618. The search input component 602, the search result component 604 and the search navigation component 606 may be visually differentiated, for example, by a displayed location, a visual grouping and/or one or more explicit elements of visual separation and/or differentiation. In the example user interface 600, visual presentation areas associated with the search input component 602, the search result component 604 and the search navigation component 606 are contiguous. However, each embodiment need not be so limited. For example, aspects of the category hierarchy presentation 614 and/or the refinement presentation 616 may be incorporated into the visual presentation area associated with the search result component 604.

The user of the user interface 600 may input text with the text input component 608. The text input may be any suitable text. Example of suitable text include one or more strings of alphanumeric characters, one or more strings of symbols such as symbols corresponding to keys of a keyboard, words of a language including words of a natural language such as English, and suitable combination thereof. The text input may correspond to one or more search terms. The search submission component 610 may be selected, for example, to submit the text to a search facility (not shown in FIG. 6). For example, the search facility may be implemented at least in part by the application server 108 of FIG. 1. Further aspects of an example search facility are described below with reference to FIG. 8.

The search results presented by the search result component 610 may correspond to one or more search terms input with the text input component 608. For example, the presented search results may be a presentation of a portion of a search result set provided by the search facility responsive to the submitted search terms. Each presented search result may correspond to an item such as one of the items 224, 226, 228, 230, 232 of FIG. 2. For example, the search result presentation 612 may include a name of the item (item name), one or more attributes of the item (item attributes), a representative image of the item (image) and a description of the item (item description). FIG. 6 depicts each of the search results presented by the search result component 610 as having a similar presentation format. However, each embodiment need not be so limited.

The name of the item may be any suitable item identifier. For example, the name may include one or more strings of symbols such as alphanumeric characters and/or words of a language such as a natural language. Presented attributes of the item may be selected from a suitable set of item attributes. Suitability of a particular attribute for presentation may depend on a type of the item, a context of the search, a purpose of the user interface 600 and/or a theme of the user interface 600. For example, the item may be a representation of an electronic document. In this example, suitable item attributes may include one or more authors, a publication date, one or more document statistics including document size, and one or more document location specifications such as uniform resource locators (URLs). As another example, the search may have a commercial context. In this example, suitable item attributes may include one or more availability specifications including a number of items in stock and one or more dates and/or date ranges, one or more quality specifications, one or more prices and/or price components including base price, taxes and delivery costs, one or more popularity scores, and one or more consumer review ratings. The representative image of the item may be an image rendered from image data in any suitable image format. The description of the item may include any suitable text, for example, hypertext.

The category hierarchy presentation 614 may present, for example, a portion of a category hierarchy such as the category hierarchy 212 of FIG. 2. If the search resulting in the search result set at least partially presented by the search result component 604 is explicitly associated with one or more categories, the category hierarchy presentation 614 may indicate the category or categories with which the search is associated. If the search is unassociated with at least one category, the category hierarchy presentation 614 may indicate that the search is unassociated with a category and/or may indicate a set of categories and/or category sub-hierarchies, for example, including categories containing items in the presented search results and/or the search result set. In at least one embodiment, if search is unassociated with at least one category, the category hierarchy presentation 614 may indicate a set of units, for example, that contain items in the search results and/or the search result set.

The refinement presentation 616 may present, for example, a portion of a refinement hierarchy such as the refinement hierarchy 308 of FIG. 3. If the search resulting in the search result set at least partially presented by the search result component 604 is explicitly associated with one or more categories, the refinement presentation 616 may present one or more refinements selected from a set of refinements that are linked to the one or more associated categories. If the search is unassociated with at least one category, the refinement presentation 616 may present one or more refinements selected from a set of refinements that are linked to one or more possibly relevant categories. For example, the one or more possibly relevant categories may be determined by mapping one or more search terms associated with the search to one or more categories in the category hierarchy 212 of FIG. 2. In at least one embodiment, the one or more possibly relevant categories may be determined independent of items corresponding to search results in the search result set. For example, the mapping may be performed in accordance with a predetermined refinement surfacing map described below in more detail with reference to FIG. 8.

Although the example user interface 600 depicts the refinement presentation 616 as contiguous and located within a visual presentation area associated with the search navigation component 606, each embodiment of the invention need not be so limited. In at least one embodiment, the refinement presentation 616, or some portion thereof, may be incorporated into one or more visual presentation areas associated with the search input component 602 and/or the search result component 604. For example, a portion of the refinement presentation 616 may be displayed above the search result presentation 612. Particular refinements and/or refinement value options may be visually emphasized, for example, at least in part by being displayed along with an iconic and/or graphical representation. Portions of the refinement hierarchy selected for presentation may be based at least in part on a ranking and/or ordering as described below in more detail. Higher ranking refinements may be displayed in user interface 600 visual presentation areas associated with higher user visibility.

Items in the collection 402 (FIG. 4) may be grouped into groups specified with any suitable criterion. In particular, items may be grouped according to criteria other than category. Examples of suitable criteria include, but are not limited to, criteria based at least in part on demographics, user clickstream, clickstream aggregates including popular clickstreams, purchase history, explicit user grouping, explicit user grouping aggregates including popular groupings, and suitable combinations thereof. A user clickstream may include a history of the user's interaction with (e.g., mouse "clicks" with respect to) a user interface (e.g., to the search facility) such as the user interface 600. In at least one embodiment, the item groups presentation 618 may include a presentation of one or more such item groups. Selection of a group presented in the item groups presentation 618 may constrain the search in accordance with the selected group. Alternatively, selection of the group presented in the item groups presentation 618 may correspond to a new search.

Figure 7:
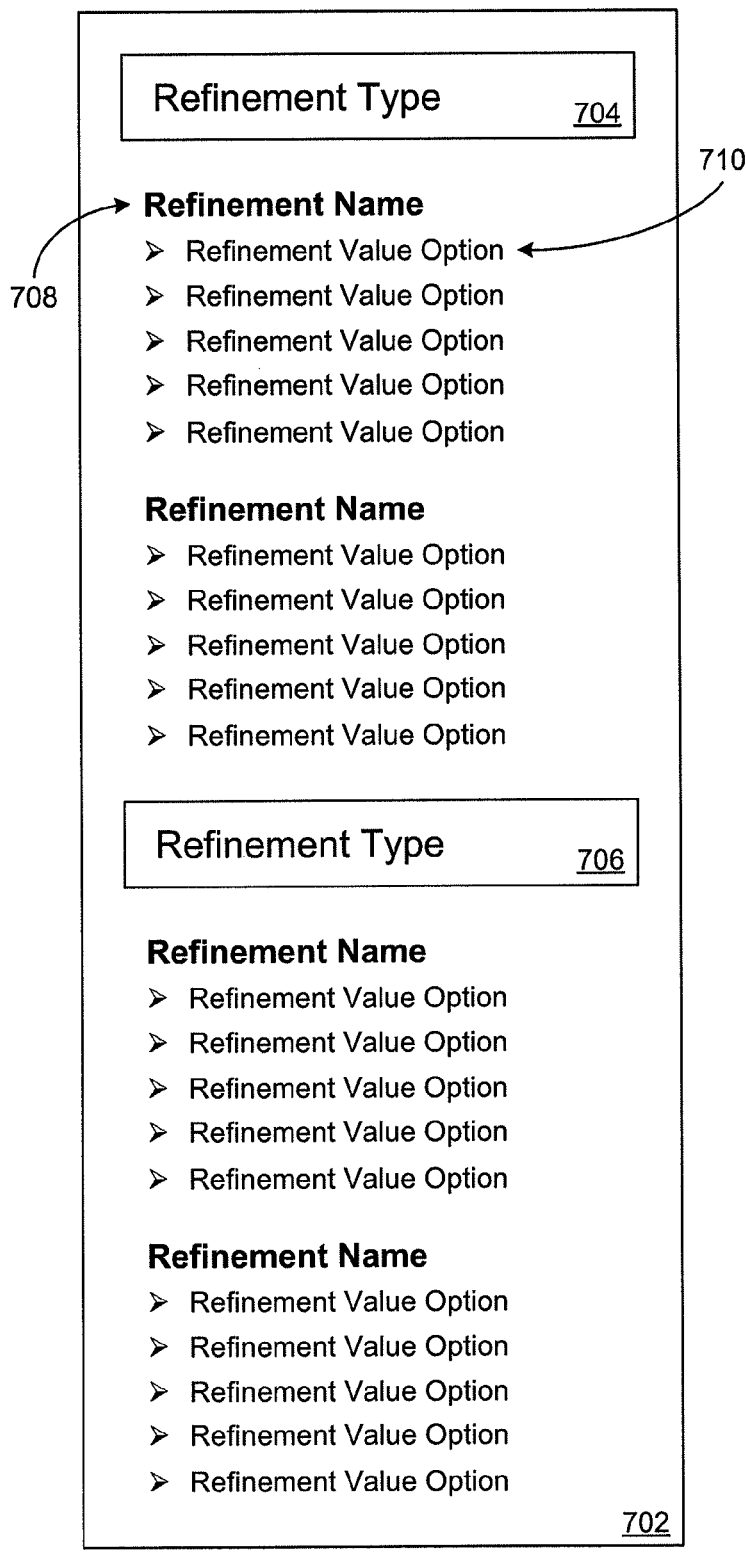
FIG. 7 is a schematic diagram depicting aspects of an example refinement presentation in accordance with at least one embodiment.
Figure 8:
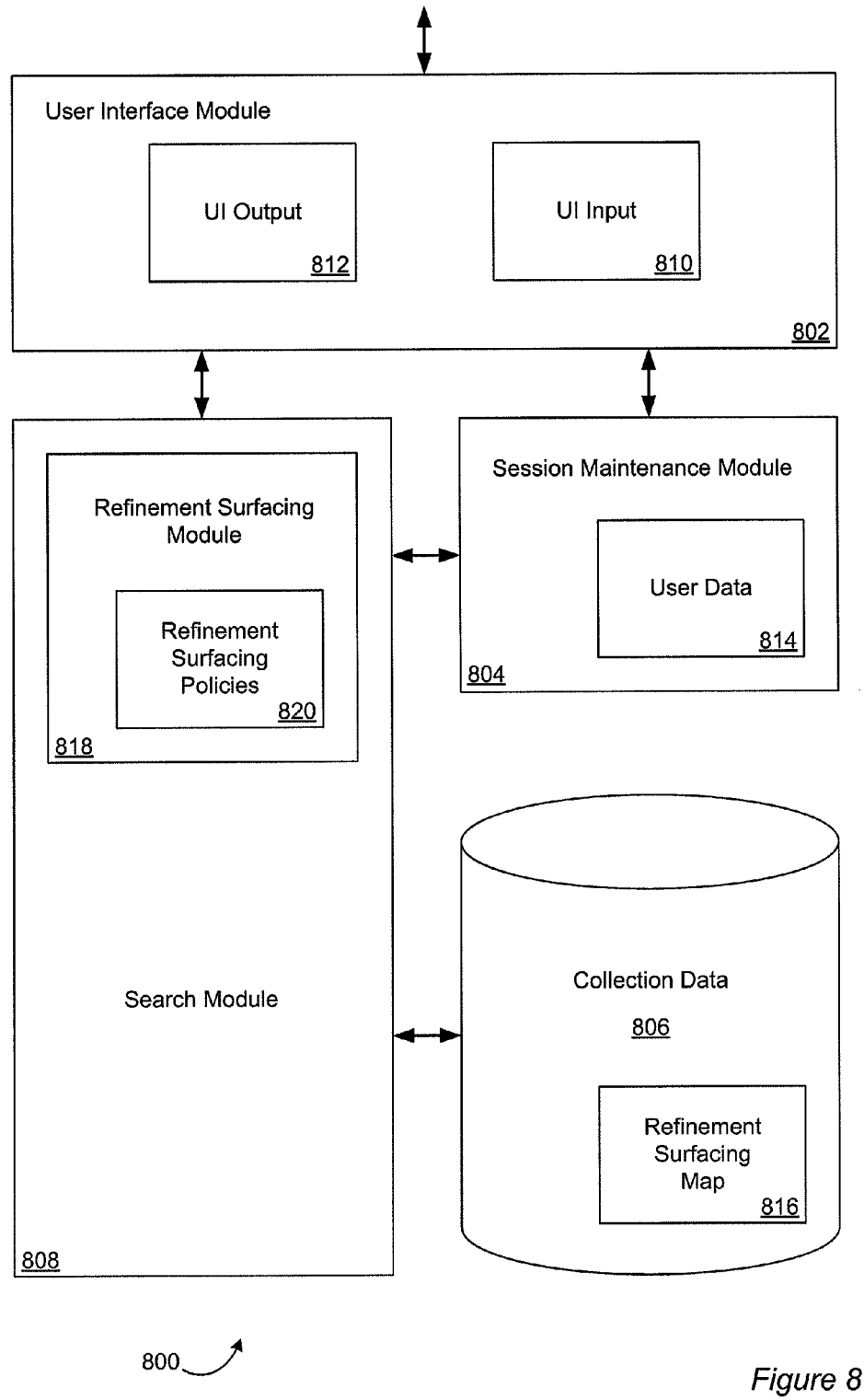
FIG. 8 is a schematic diagram depicting aspects of an example search facility in accordance with at least one embodiment.

Before turning to FIG. 8, it will be helpful to have reference to a more detailed example of the refinement presentation 616. FIG. 7 depicts aspects of an example refinement presentation 702 in accordance with at least one embodiment. The refinement presentation 702 may include presentation of multiple types of refinement 704, 706. The presentation of each type of refinement 704, 706 may include a presentation of multiple refinements such as refinement 708, each having a name. The presentation of each refinement, such as the refinement 708, may include a presentation of multiple refinement value options such as refinement value option 710.

For example, refinements corresponding to refinement presentations such as the refinement presentation 708 may be arranged in a refinement hierarchy such as the refinement hierarchy 308 of FIG. 3, and the refinement types 704, 706 of the presentation 702 may correspond to refinements 310, 312 at a higher level in the hierarchy 308 than the refinements 314, 316 corresponding to refinement presentations such as the refinement presentation 708. Alternatively, or in addition, the refinement types 704, 706 of the presentation 702 may correspond to units 204, 206, 208 (FIG. 2) of the unit layer 210, linked categories of the category hierarchy 212, or suitable combinations thereof. The refinement value options such as the refinement value option 710 of the presentation 702 may correspond to refinements (not shown in FIG. 3) at a lower level in the hierarchy 308 than the refinements 314, 316 corresponding to refinement presentations such as the refinement presentation 708. Alternatively, or in addition, the refinement value options such as the refinement value option 710 of the presentation 702 may correspond to selected ones of a set of enumerated attribute values for the refinement corresponding to the refinement presentation 708, selected ranges of attribute values for the refinement, and suitable combinations thereof.

The search facility may provide functionality that enables the user interface 600 (FIG. 6). FIG. 8 depicts aspects of an example search facility 800 in accordance with at least one embodiment. The search facility 800 may include a user interface module 802, a session maintenance module 804, a set of collection data 806, and a search module 808. The user interface module 802 may include a user interface (UI) input module 810 and a UI output module 812. The session maintenance module 804 may maintain a variety of session data (e.g., associated with a search session) including user data 814. The collection data 806 may include one or more data structures for maintaining one or more collections such as the collection 402 (FIG. 4) as well as one or more data structures facilitating search of the collection(s) such as a refinement surfacing map 816. The search module 808 may implement a variety of search functionality and, in particular, may include a refinement surfacing module 818. The refinement surfacing module 818 may incorporate and/or be configured with a set of refinement surfacing policies 820, and may surface refinements such as the refinements 310, 312, 314, 316 (FIG. 3) of the refinement hierarchy 308 in accordance with the refinement surfacing policies 820. For example, aspects of the search facility 800 may be implemented with a suitable combination of the Web server 106, the application server 108 and the data store 110 in a manner well understood by those of skill in the art.

As described above, the user interface 600 (FIG. 6) may be presented to the user by the client device 102 of FIG. 1. For example, the client device 102 may include a Web browser and the user interface 600 may be presented to the user in the Web browser. The presentation of the user interface 600 may be specified with one or more structured languages and/or presentation specification languages such as a hypertext markup language (e.g., an HTML) and/or an extensible markup language (e.g., an XML). For example, the user interface 600 may be specified at least in part with an HTML document. The specification of the user interface 600 may be generated by the UI output module 812 of the user interface module 802.

The user may interact with the user interface 600 (FIG. 6) at the client device 102 (FIG. 1). Responsive to the interaction, the client device 102 or some module thereof (e.g., the Web browser on the client device 102) may generate and/or cause to be generated one or more protocol messages to the Web server 106 and/or the application server 108. For example, the user may submit search terms to the search facility 800 with one or more protocol messages such as messages of a hypertext transfer protocol (e.g., an HTTP). Such protocol messages may be received by the user interface module 802 and parsed by the UI input module 810. For example, the UI input module 810 may parse the search term(s) from the protocol message(s) and communicate them to the search module 808 to generate a relevant search result set.

The search may take place in a context of one or more sessions such as a communication session, an interaction session, a search session, and suitable combinations thereof. The session maintenance module 804 may maintain the one or more sessions. For example, the session maintenance module 804 may instantiate, provide access to, update and/or delete the one or more sessions. Protocol messages sent and/or received by the user interface module 802 may include an identifier corresponding to a session identifier, thus enabling association of protocol messages and/or sequences of protocol messages with the session(s). The session maintenance module 804 may associate the session(s) with a particular user. For example, the user may provide authenticating credentials. The session maintenance module 804 may then extract user data 814 from properties of the protocol messages and/or the sequences of protocol messages.

A search term may include one or more words, phrases, sentences and/or expressions of a language including natural languages such as English. For example, each of "bass," "fishing," "guitar," "bass fishing," and "bass guitar" may be considered a distinct search term. The refinement surfacing map 816 may include a plurality of search terms. The refinement surfacing map 816 may map each included search term to one or more categories such as the categories 216, 218, 220, 222 (FIG. 2) of the category hierarchy 212. The set of categories to which a particular search term maps may be considered a possibly relevant set of categories for the search term. Each mapping from a particular search term to a particular category may have an associated confidence ("mapping confidence"). If the mapping confidence for the (search term, category) pair exceeds a teleport threshold, the search may be automatically associated with the category (the search may be "teleported" to the category). However, in at least one embodiment, such an occurrence may be uncommon. That is, it may be uncommon to have sufficient confidence to enable an automatic association of the search with a particular category. Automatic association of the search with a particular category without sufficient confidence may be considered premature narrowing of the search. In contrast, there may be sufficient confidence to surface refinements linked to the possibly relevant categories.

The search module 808 may search, for example, the collection 402 (FIG. 4) of items to generate a search result set including and/or referencing ones of the items. Items included and/or referenced by ("in") the search result set may match (e.g., be relevant with respect to) one or more search terms. Items in the search result set may best match the one or more search terms, for example, may be most relevant with respect to the one or more search terms. That is, the search module 808 may employ the one or more search terms to generate the search result set. For example, the search module 808 may determine a relevance score for each (search term, item) pair in the collection 402 and include those items for which the relevance score exceeds a threshold. The search module 808 may utilize any suitable search term to item matching technique. Such matching techniques are well known in the art and need not be detailed here. A particular search may become explicitly associated with a particular category, for example, one of the categories 216, 218, 220, 222 (FIG. 2) of the category hierarchy 212. For example, the user may explicitly associate the search with a particular category by selecting a presentation of the category in the category hierarchy presentation 614 (FIG. 6) of the user interface 600. If the search is explicitly associated with a particular category, the search module 808 may narrow the search to that category. For example, the search module 808 may select items for the search result set from the category. However, in at least one embodiment, it may not be uncommon for the search to begin as unassociated with a particular category. A portion of the search result set generated by the search module 808 may be presented by the search result component 604 of the user interface 600.

The refinement surfacing module 818 may select a set of possibly relevant refinements, for example, from the refinement hierarchy 308 of FIG. 3. If the search is explicitly associated with a particular category, the refinement surfacing module 818 may select the set of possibly relevant refinements from among the set of refinements linked to the category. If the search is unassociated with a particular category, the refinement surfacing module 818 may select the set of possibly relevant refinements from the set of refinements linked to the set of possibly relevant categories for the search, for example, for the search term(s) associated with the search. The refinement surfacing module 818 may further select a set of refinements to be presented from among the set of possibly relevant refinements. For example, the refinement surfacing module 818 may provide the set of refinements to be presented to the user interface module 802, which may in turn encode the set of refinements to be presented into the presentation specification of the user interface 600 (FIG. 6).

The set of possibly relevant refinements may be selected by the refinement surfacing module 818 in accordance with the set of refinement surfacing policies 820. For example, one or more policies of the set may specify one or more actions to take in case the search is explicitly associated and/or unassociated with a particular category. One or more policies may specify that the set of possibly relevant categories to be considered include categories with a mapping confidence above a relevance threshold such as a minimally relevant threshold. Furthermore, the set of refinements to be presented may be selected by the refinement surfacing module 818 from the set of possibly relevant refinements in accordance with the set of refinement surfacing policies 820. For example, one or more policies of the set may specify a presentation order for the set of possibly relevant refinements. One or more of the policies may specify a number of refinements to be selected for presentation and/or in accordance with presentation constraints such as a limited and/or allocated presentation space.

The presentation order for the set of possibly relevant refinements may be specified with any suitable ordering criterion. For example, the refinement surfacing module 818 may determine a relevance score for refinements in the set of possibly relevant refinements, and the set may be ordered (e.g., ranked) according to the relevance scores. Relevance scoring techniques are well known in the art and need not be detailed here. Any suitable relevance scoring technique may be employed to determined relevance scores for refinements. As another example, the refinement surfacing module 818 may determine an efficiency score for refinements in the set of possibly relevant refinements, and the set may be ordered (e.g., ranked) according to the efficiency scores. For example, the efficiency may be an efficiency in achieving a goal of the search such as optimizing (e.g., minimizing) search time and/or a commercial efficiency such as a profitability and/or a sales conversion ratio. As yet another example, the presentation order of a particular refinement may be based at least in part on a weighting factor corresponding to the level of a linked category in the category hierarchy 212 (FIG. 2). As still another example, the presentation order of a particular refinement may be based at least in part on a popularity of the refinement, for example, as determined by a ratio of historical selections to presentations of the refinement. The term "historical" as used herein may be understood as one or more moments, events and/or time periods prior to a current moment, event and/or time period. As still yet another example, the presentation order of the set of possibly relevant refinements may be at least partially pseudorandom, for example, to offset a positive feedback bias with respect to popularity-based orderings. As a further example, the presentation order may be predetermined (e.g., specified by an administrator) and/or weighted with predetermined weights. Examples of suitable ordering criteria include, but are not limited to, suitable combinations of the above examples.

Figure 9:
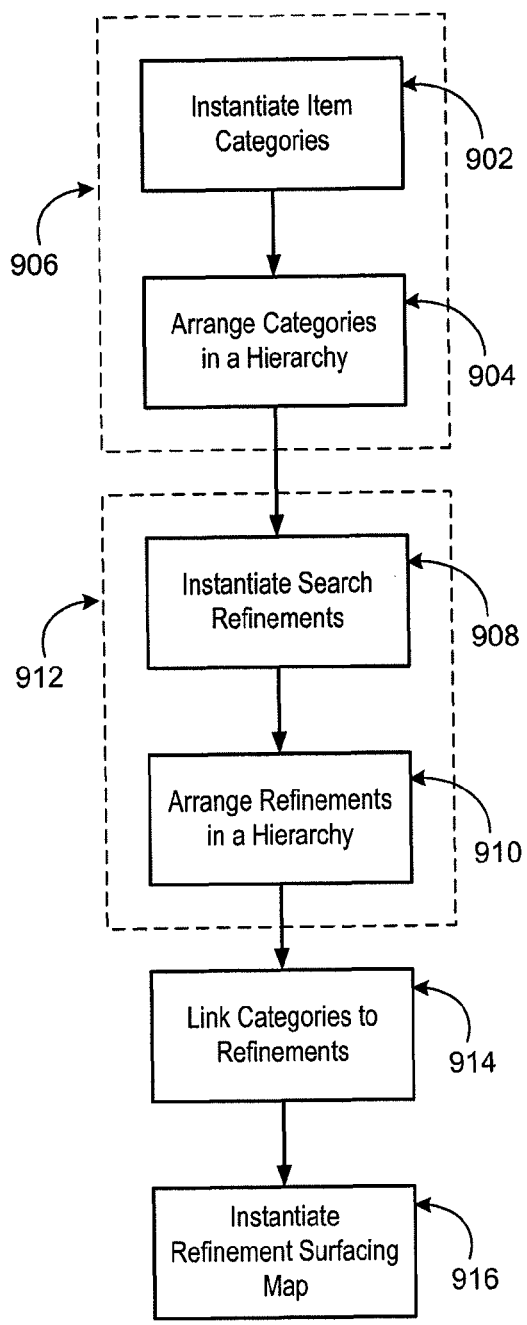
FIG. 9 is a flowchart depicting example steps for facilitating a search in accordance with at least one embodiment.
Figure 10:
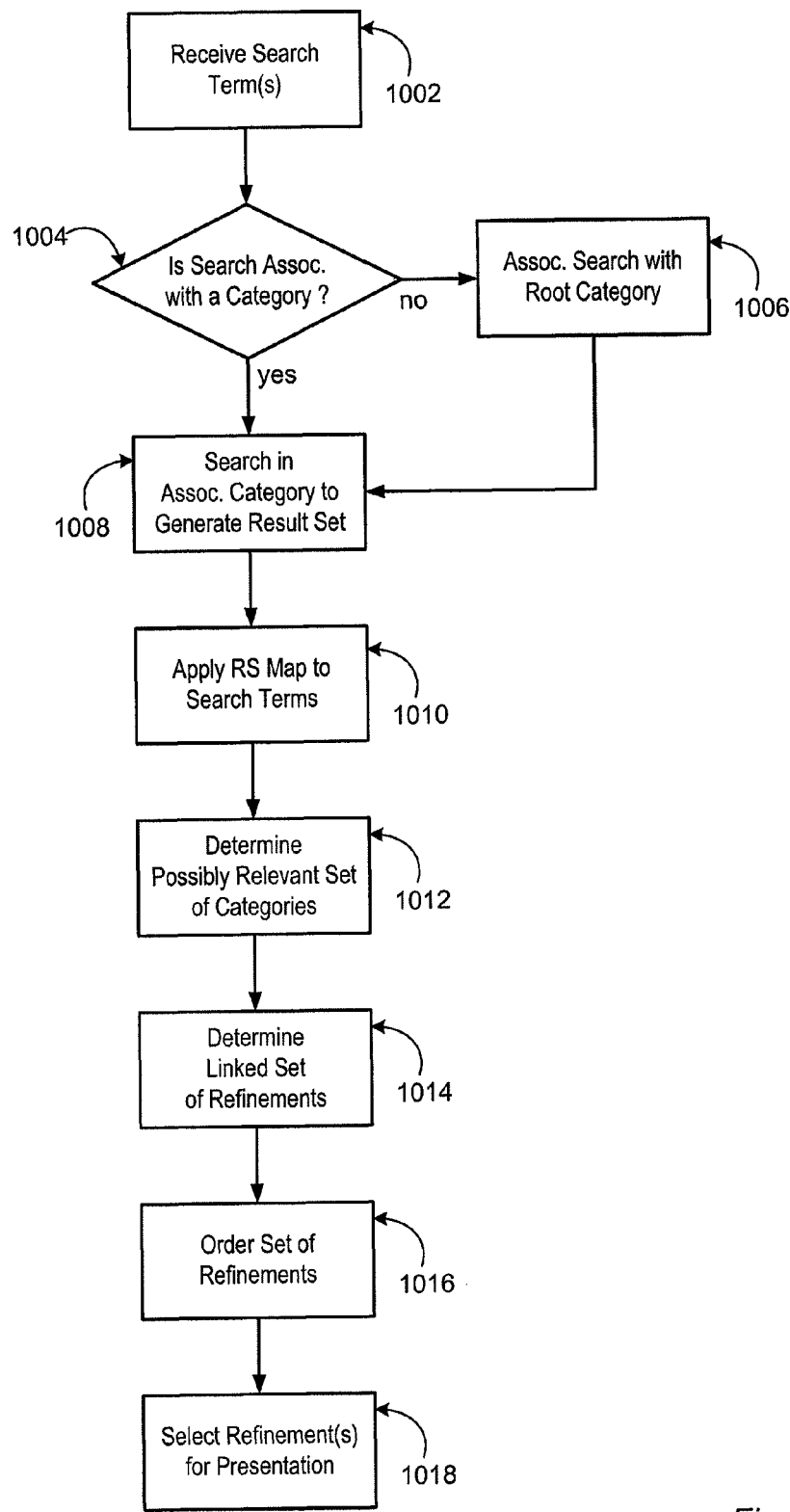
FIG. 10 is a flowchart depicting further example steps for facilitating a search in accordance with at least one embodiment.

It will be helpful to describe example steps that may be performed in accordance with at least one embodiment. FIGS. 8, 9 and 10 depict example steps for facilitating a search in accordance with at least one embodiment. For example, the depicted steps may be performed by the search facility 800 of FIG. 8. However, each embodiment need not be so limited. The steps depicted in FIG. 9 establish and/or maintain data structures that facilitate search.

At step 902, a plurality of item categories may be instantiated. For example, the categories 216, 218, 220, 222 of FIG. 2 may be instantiated as part of the collection data 806 (FIG. 8). The categories 216, 218, 220, 222 may be specified and/or instantiated with any suitable category specification technique including manual specification by an administrator of the search facility 800 and automated specification, for example, based at least in part on clustering with respect to semantic statistics and/or clickstream statistics including popularity, and suitable combinations thereof. In at least one embodiment, instantiating the categories 216, 218, 220, 222 may include categorizing the items 224, 226, 228, 230, 232. At step 904, the item categories may be arranged into a hierarchy. For example the categories 216, 218, 220, 222 may be arranged into the category hierarchy 212. In at least one embodiment, step 902 and step 904 may be integrated as depicted by dashed line 906. For example, specification of the category hierarchy 212 may be integral to category definition and/or specification.

At step 908, a plurality of search refinements may be instantiated. For example, the refinements 310, 312, 314, 316 of FIG. 3 may be instantiated as part of the collection data 806 (FIG. 8). The refinements 310, 312, 314, 316 may be specified and/or instantiated with any suitable refinement specification technique including manual specification by an administrator of the search facility 800. At step 910, the search refinements may be arranged into a hierarchy. For example, the refinements 310, 312, 314, 316 may be arranged into the refinement hierarchy 308. In at least one embodiment, step 908 and step 910 may be integrated as depicted by dashed line 912. For example, the specification of the refinement hierarchy 308 may be integral to refinement definition and/or specification.

At step 914, one or more of the item categories may be linked to one or more of the search refinements. For example, the categories 410, 412, 414 may be linked to the refinements 416, 418, 420 as depicted in FIG. 4. The linkages may be specified and/or instantiated with any suitable linking technique including manual specification by an administrator of the search facility 800 (FIG. 8). At step 916, a refinement surfacing map may be instantiated. For example, the refinement surfacing map 816 may be instantiated as part of the collection data 806. The refinement surfacing map 816 may be specified and/or instantiated with any suitable map specification technique including manual specification by an administrator of the search facility 800 and automated specification, for example, based at least in part on one or more determined relevances of the item categories to the search terms including determined relevances based at least in part on item category metadata and/or descriptive data, historical correlations between search terms and subsequently selected categories (e.g., a popularity thereof), and/or weightings with respect to an efficiency such as a commercial efficiency, and suitable combinations thereof.

Turning now to FIG. 10, at step 1002, one or more search terms may be received. For example, the search term(s) may be received by the user interface module 802 (FIG. 8) responsive to entry and submission of the search term(s) by the user interacting with the search input component 602 of the user interface 600 depicted in FIG. 6. The search term(s) may be associated with a search. For example, the search term(s) may correspond to the search, or the search term(s) may correspond to a new submission within the search. At step 1004, it may be determined if the search associated with the search term(s) is explicitly associated with a category. For example, the search may have been explicitly associated with a particular unit 204, 206, 208 of the collection 202 of FIG. 2, a particular category 216, 218, 220, 222 of the category hierarchy 212, or the search may not yet be explicitly associated with any such unit and/or category. In at least one embodiment, new searches may be unassociated with a particular category by default and/or may remain unassociated with a particular category absent an explicit selection by the user of the search facility 800 and/or of the user interface 600. If the search is determined to be unassociated with a particular category, a procedure incorporating step 1004 may progress to step 1006. Otherwise, the procedure may progress directly to step 1008.

At step 1006, the search may be explicitly associated with a root category of a hierarchy. For example, the search may be explicitly associated with the root category 202 of the collection 202 of FIG. 2. In at least one embodiment, a search unassociated with a particular category and a search explicitly associated with the root category 202 of the collection 202 may be treated similarly. At step 1008, a search result set may be generated. Furthermore, the search result set may be generated based at least in part on items selected from one or more categories explicitly associated with the search. For example, the search module 808 (FIG. 8) of the search facility 800 may generate the search result set based at least in part on the collection data 806.

At step 1010, a refinement surfacing (RS) map may be applied to the search term(s). For example, the refinement surfacing module 818 (FIG. 8) may apply the refinement surfacing map 816 to the search term(s) received at step 1002. Applying the refinement surfacing map 816 to the search term(s) may map the search term(s) to one or more categories such as the categories 410, 412 of FIG. 4. At step 1012, a possibly relevant set of categories may be determined. For example, the possibly relevant set of categories may correspond to and/or include the one or more categories to which the refinement surfacing map 816 maps the search term(s). Alternatively, or in addition, the possibly relevant set of categories may correspond to and/or include one or more category sub-hierarchies that include the one or more categories to which the refinement surfacing map 816 maps the search term(s). The one or more category sub-hierarchies may be a set of category sub-hierarchies that include the one or more categories such that the root categories of sub-hierarchies in the set have a lowest level (i.e., a highest level number) and the number of sub-hierarchies in the set is no more than a threshold number (e.g., one). In at least one embodiment, the possibly relevant set of categories may be determined in accordance with one or more of the refinement surfacing policies 820.

At step 1014, a linked set of refinements may be determined. For example, the refinement surfacing module 818 (FIG. 8) may determine which of the refinements 416, 418, 420 (FIG. 4) in the collection 402 are linked to the possibly relevant set of categories determined at step 1012. The linked set of refinements may correspond to the set of possibly relevant refinements, and may be a subset and/or a sub-hierarchy of the refinement hierarchy 408. At step 1016, a set of refinements may be ordered. For example, the refinement surfacing module 818 may order the set of refinements determined at step 1014 in accordance with one or more of the refinement surfacing policies 820 as described above with reference to FIG. 8. At step 1018, one or more refinements may be selected for presentation. For example, the refinement surfacing module 818 may select one or more of the set of refinements ordered at step 1016 in accordance with one or more of the refinement surfacing policies 820. Such policies may include selecting no more than a threshold number (e.g., one or two) of refinements and/or refinements of a particular level for presentation, as well as selecting the refinement(s) from the set of refinements in the order established at step 1016.

Figure 11:
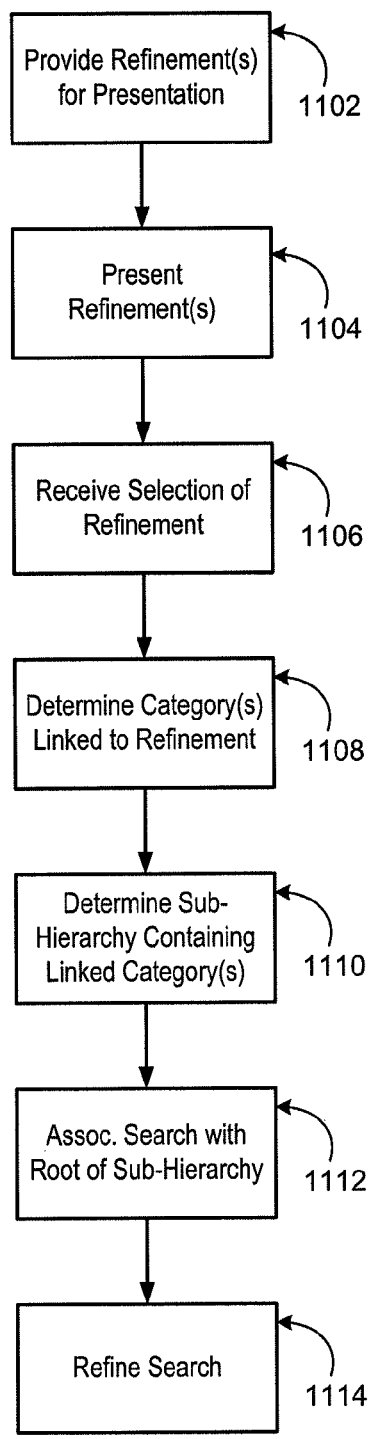
FIG. 11 is a flowchart depicting still further example steps for facilitating a search in accordance with at least one embodiment.

Turning now to FIG. 11, at step 1102, one or more refinements may be provided for presentation. For example, the refinement surfacing module 818 (FIG. 8) may provide the refinement(s) selected for presentation at step 1018 (FIG. 10) to the UI output module 812 of the user interface module 802. As another example, the UI output module 812 and/or the user interface module 802 may provide the refinement(s) selected for presentation to the client device 102 of FIG. 1 and/or the Web browser thereof. At step 1104, one or more refinements may be presented. For example, the client device 102 and/or the Web browser thereof may present the refinement(s) provided at step 1102 in the user interface 600 of FIG. 6.

The search result set associated with the search term(s) may be large. The presented refinement(s) enable the searcher to reduce the search result set without having to enter additional free form search terms. Furthermore, selection of a particular refinement by the searcher may raise confidence in some linked category to an extent that justifies explicitly associating the search with the linked category. At step 1106, a selection of a refinement may be received. For example, the user may select the refinement 708 of FIG. 7 and/or the refinement value option 710 in the user interface 600, and the client device 102 and/or the Web browser thereof may provide the selection of the refinement and/or an indication thereof to the UI input module 810 and/or the user interface module 802 of the search facility 800.

At step 1108, one or more categories linked to the refinement may be determined. For example, the refinement surfacing module 818 (FIG. 8) may determine which of the categories 410, 412 (FIG. 4) of the collection 402 are linked to the refinement 420 received at step 1106 (i.e., category 412 in this example). At step 1110, a sub-hierarchy containing the linked category or categories may be determined and/or selected. To continue the example, the refinement surfacing module 818 may determine that each of the sub-hierarchies 412, 410, 404, 402 rooted at the category 412, the category 410, the unit 404 and the collection 402 contain the category 412. The refinement surfacing module 818 may determine sub-hierarchy 412 to be the smallest containing sub-hierarchy (i.e., the sub-hierarchy rooted at the lowest level that contains the linked category or categories).

At step 1112, the search may be associated with the root of the containing sub-hierarchy. For example, the refinement surfacing module 818 (FIG. 8) may explicitly associate the search with the root category of the containing sub-hierarchy determined at step 1110. Alternatively, confidences for the possibly relevant set of categories determined at step 1012 (FIG. 10) may be recalculated based at least in part on the one or more linked categories found at step 1108, for example, the confidence(s) for the one or more linked categories may be boosted. At step 1114, the search may be refined. For example, the search module 808 may generate a new search result set in accordance with the refinement received at step 1106 and/or may select items for the new search result set from items in the containing sub-hierarchy determined at step 1110.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computerized system for facilitating a search of a plurality of items, comprising:
   a data store storing, at least:
      a hierarchy of categories that categorize at least some of the plurality of items;
      a set of search refinements, at least some of the hierarchy of categories being linked to at least some of the set of search refinements; and
      a refinement surfacing map depicting a plurality of associations between search terms and at least some of the hierarchy of categories;
   a search module configured at least to
      generate a search result set of items from the plurality of items that match one or more search terms; and
      maintain a log of a number of times a refinement of the set of search refinements is selected during searches employing the one or more search terms in one or more time periods;
   a refinement surfacing module configured to, at least:
      determine a possibly relevant set of categories of the hierarchy of categories below a distinguished category based at least in part on the log;
      increase an associative confidence between at least one of the one or more search terms and a subset of the set of search refinements linked to the possibly relevant set of categories based at least in part on the log; and
      determine the subset of the set of search refinements linked to the possibly relevant set of categories when the associative confidence at least meets a first sufficiency threshold;
   a user interface module configured at least to, as least
      provide the search result set of items and said subset of the set of search refinements for presentation;
      constrain subsequent search result sets to a particular distinguished category, based at least on the one or more search terms, when the associative confidence meets at least a second sufficiency threshold; and
   one or more processors collectively facilitating at least the data store, the search module, the refinement surfacing module and the user interface module.

2. A computerized system according to claim 1, wherein the distinguished category is a root category of the hierarchy of categories.

3. A computerized system according to claim 1, wherein generating the search result set of items from the plurality of items that match one or more search terms comprises:
   for each of the plurality of items in the search result set of items, determining a relevance score for one of the plurality of items with respect to the one or more search terms; and
   determining whether the relevance score for the one of the plurality of items is above a threshold.

4. A computer-implemented method for facilitating a search of a plurality of items categorized according to a category hierarchy, comprising:
   under control of one or more computer systems configured with executable instructions,
      generating a search result set of items from the plurality of items that match one or more search terms;
      identifying at least one category in the category hierarchy below a distinguished category based at least in part on the one or more search terms and a map depicting a plurality of associations between search terms and at least some categories of the category hierarchy;
      receiving a selection of at least one refinement from a set of refinements linked to said at least one category;
      maintaining a log of a number of times the at least one refinement from the set of refinements is selected during searches employing the one or more search terms in one or more time periods;
      determining a possibly relevant set of categories of the category of hierarchy below a distinguished category based at least in part on the log;
      increasing an associative confidence between at least one of the one or more search terms and a subset of the set of refinements linked to the possibly relevant set of categories based at least in part on the log;
      determining the subset of the set of refinements linked to the possibly relevant set of categories when the associative confidence at least meets a first sufficiency threshold;
      providing the search result set of items and said subset of the set of refinements for presentation; and
      constraining subsequent search result sets to a particular distinguished category, based at least on the one or more search terms, when the associative confidence meets at least a second sufficiency threshold.

5. A computer-implemented method according to claim 4, further comprising ordering the set of refinements in accordance with at least one refinement surfacing policy.

6. A computer-implemented method according to claim 4, wherein selecting said at least one refinement from the set of refinements comprises selecting said at least one refinement from the set of refinements in an order specified by the ordering of the set of refinements.

7. A computer-implemented method for facilitating a search, comprising:
   under control of one or more computer systems configured with executable instructions,
      associating the search with a category in a category hierarchy;
      searching the category to find items matching one or more search terms;
      identifying at least one further category at a level below the category in the category hierarchy based at least in part on the one or more search terms and a map for surfacing refinements, the map depicting a plurality of associations between search terms and the at least one further category;
      receiving a selection of at least one refinement from a set of refinements linked to said at least one further category;
      maintaining a log of a number of times a refinement of the set of refinements is selected during searches employing the one or more search terms in one or more time periods;
      determining a possibly relevant set of categories of the category hierarchy below a distinguished category based at least in part on the log;
      increasing an associative confidence between at least one of the one or more search terms and a subset of the set of refinements linked to the possibly relevant set of categories based at least in part on the log;
      determining the subset of the set of refinements linked to the possibly relevant set of categories when the associative confidence at least meets a first sufficiency threshold;
      providing the items and said subset of the set of refinements for presentation; and
      constraining subsequent search results to a particular distinguished category, based at least on the one or more search terms, when the associative confidence meets at least a second sufficiency threshold.

8. A computer-implemented method according to claim 7, wherein:
the category hierarchy has a root category; and
the category associated with the search is the root category of the category hierarchy.

9. A computer-implemented method according to claim 7, wherein:
the map for surfacing refinements comprises a map from search terms to at least some categories in the category hierarchy; and
identifying said at least one further category comprises applying the map to the one or more search terms.

10. A computer-implemented method according to claim 7, wherein a refinement is linked to a category when the refinement is applicable to items in the category.

11. A computer-implemented method according to claim 7, further comprising:
determining a containing sub-hierarchy that includes each category linked to a distinguished refinement of said at least one refinement; and
associating the search with a root category of the containing sub-hierarchy.

12. A computer-implemented method for facilitating a search, comprising:
under control of one or more computer systems configured with executable instructions,
categorizing at least some of a first plurality of items included in a search result set of items into at least one of a plurality of categories arranged in a category hierarchy having a root category;
selecting a second plurality of items from the first plurality of items based at least in part on one or more search terms and independent of categories in the category hierarchy other than the root category;
selecting a plurality of refinements from a set of refinements based at least in part on the one or more search terms and a map depicting a plurality of associations between search terms and categories of the category hierarchy, and links between the categories and the set of refinements;
receiving a selection of at least one of the plurality of refinements linked to the at least one of a plurality of categories;
maintaining a log of a number of times the at least one refinement of the plurality of refinements is selected during searches employing the one or more search terms in one or more time periods;
determining a possibly relevant set of categories of the category hierarchy below a distinguished category based at least in part on the log;
increasing an associative confidence between at least one of the one or more search terms and a subset of the set of refinements linked to the possibly relevant set of categories based at least in part on the log;
determining the subset of the set of refinements linked to the possibly relevant set of categories when the associative confidence at least meets a first sufficiency threshold;
providing said subset of the set of refinements for presentation; and
constraining subsequent search result sets to a particular distinguished category, based at least on the one or more search terms, when the associative confidence meets at least a sufficiency second threshold.

13. A computer-implemented method according to claim 12, wherein selecting the plurality of refinements comprises:
identifying a possibly relevant set of categories by applying the map to the one or more search terms; and
selecting refinements in the set of refinements linked to categories in the possibly relevant set of categories.

14. A computer-implemented method according to claim 12, wherein ordering the plurality of refinements comprises determining a relevance score for at least some of the plurality of refinements.

15. A computer-implemented method according to claim 14, wherein determining the relevance score for each of the plurality of refinements comprises determining an efficiency of each of the plurality of refinements.

16. A computer-implemented method according to claim 14, wherein determining the relevance score for each of the plurality of refinements comprises determining a commercial efficiency of each of the plurality of refinements.

17. A computer-implemented method according to claim 12, wherein ordering the plurality of refinements comprises assigning a weight to at least one of the plurality of refinements of the plurality of refinements based at least in part on a distance in the category hierarchy from a root of at least one linked category.

18. A computer-implemented method according to claim 12, wherein ordering the plurality of refinements comprises determining a popularity score for at least some of the plurality of refinements.

19. A computer-implemented method according to claim 18, wherein the popularity score for each of the plurality of refinements is based at least in part on a number of times a refinement was historically selected during searches employing the one or more search terms in one or more time periods.

20. A computer-implemented method according to claim 12, wherein ordering the plurality of refinements comprises ordering at least some of the plurality of refinements pseudo-randomly.

21. A computer-implemented method according to claim 12, wherein ordering the plurality of refinements comprises ordering at least some of the plurality of refinements according to a specified ordering.

22. One or more non-transitory computer-readable media having collectively thereon computer-executable instructions that configure one or more computers to collectively, at least:
associate a search with a category in a category hierarchy;
search the category to find items matching one or more search terms;
identify at least one further category below the category in the category hierarchy based at least in part on the one or more search terms and a map for surfacing refinements, the map depicting a plurality of associations between search terms and the at least one further category;
receive a selection of at least one refinement from a set of refinements linked to said at least one further category;
maintain a log of a number of times a refinement of the set of refinements is selected during searches employing the one or more search terms in one or more time periods;
determine a possibly relevant set of categories of the category hierarchy below a distinguished category based at least in part on the log;
increase an associative confidence between at least one of the one or more search terms and a subset of the set of refinements linked to the possibly relevant set of categories based at least in part on the log;
determine the subset of the set of refinements linked to the possibly relevant set of categories when the associative confidence at least meets a first sufficiency threshold;
provide the items and said subset of the set of refinements for presentation; and, constrain subsequent search results to a particular distinguished category, based at least on the one or more search terms, when the associative confidence meets at least a second sufficiency threshold.

23. One or more non-transitory computer-readable media according to claim 22, wherein the set of refinements comprises a hierarchy of refinements.

24. One or more non-transitory computer-readable media according to claim 23, wherein selecting said at least one refinement is further based at least in part on the hierarchy.

25. One or more non-transitory computer-readable media according to claim 22, wherein said at least one refinement comprises refinements below a distinguished refinement in a hierarchy of refinements.

\* \* \* \* \*